O. G. SCRIVEN.
Milking-Stool.
No. 196,543          Patented Oct. 30, 1877.
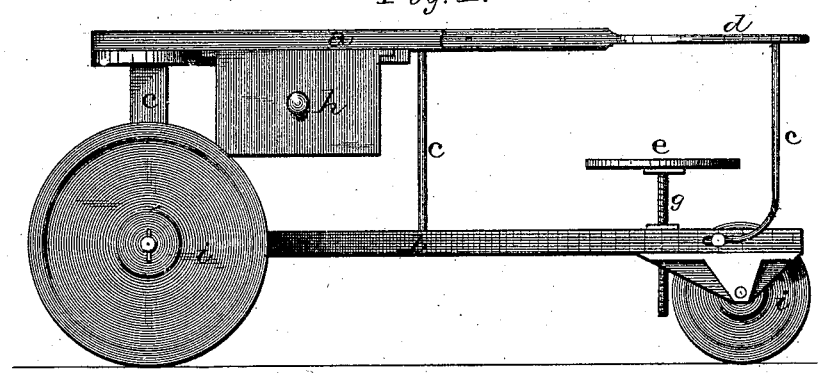
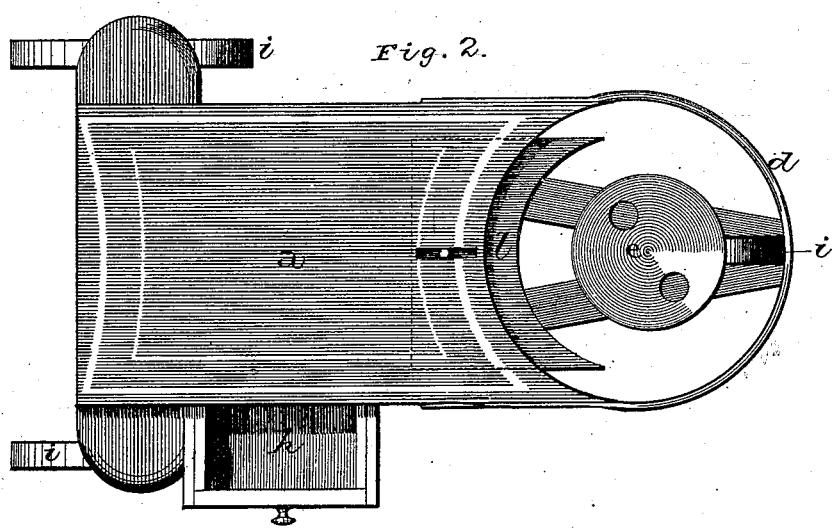
WITNESSES
INVENTOR

UNITED STATES PATENT OFFICE.

OLIVER G. SCRIVEN, OF LANGWORTHY, IOWA.

IMPROVEMENT IN MILKING-STOOLS.

Specification forming part of Letters Patent No. 196,543, dated October 30, 1877; application filed September 24, 1877.

*To all whom it may concern:*

Be it known that I, OLIVER G. SCRIVEN, of Langworthy, in the county of Jones and State of Iowa, have invented certain new and useful Improvements in Milking-Stools; and I do hereby declare the following to be a full, clear, and exact description of the invention, such as will enable others skilled in the art to which it pertains to make and use it, reference being had to the accompanying drawings, which form part of this specification.

My invention relates to an improvement in milking-stools; and it consists in providing the stool with wheels, whereby it may be moved back and forth without the milker having to get up and use his hands or stop milking, and with an adjustable rest for the milk-pail, whereby the pail can be adjusted up and down, so as to put it in the most convenient position, as will be more fully described hereinafter.

The accompanying drawings represent my invention.

*a* represents the seat of the stool, which is raised above the triangular frame *b* a suitable distance by means of the standards or supports *c*. To the forward end of this seat is secured a semicircular bail or guard, *d*, inside of which the milk-pail is to be placed while the milking is being done.

In order to adjust different-sized pails to the cows, or to accommodate the same pail to different-sized cows, the disk *e*, upon which the milk-pail rests, is provided with the screw *g*, whereby the pail can be adjusted up and down at the will of the operator. By means of this screw the pail can be moved so near to the cow that there will be no splashing of the milk as it falls into the pail.

Underneath the seat is placed a drawer, *h*, for holding sponges or cloths for washing off the cows' udders before beginning the operation of milking.

The triangular frame *b* is provided with a wheel, *i*, at each corner—two large ones and one small one, as shown. By means of these wheels the stool can be moved back and forth toward or from the cow simply by a movement of the milker's feet, and without the trouble of having to rise or use his hands in any way, or even to stop the operation of milking.

By means of a stool constructed as described it is impossible for the cow to kick over the pail, and the labor of milking is greatly reduced.

By the slide *l* under the seat, which is moved by a pivot and screw projecting above the seat, the size of the semicircular bail can be so adjusted as to accommodate any sized pail.

Having thus described my invention, I claim—

1. The combination of a milking-stool, a guard, *d*, disk *e*, and screw *g*, substantially as described.

2. In a milking-stool, the combination of the seat *a*, triangular frame *b*, braces or supports *c*, and the wheels *i*, substantially as set forth.

In testimony that I claim the foregoing I have hereunto set my hand this 15th day of September, 1877.

OLIVER G. SCRIVEN.

Witnesses:
 JOSEPH BROWN,
 A. J. MONROE.